Patented Dec. 3, 1946

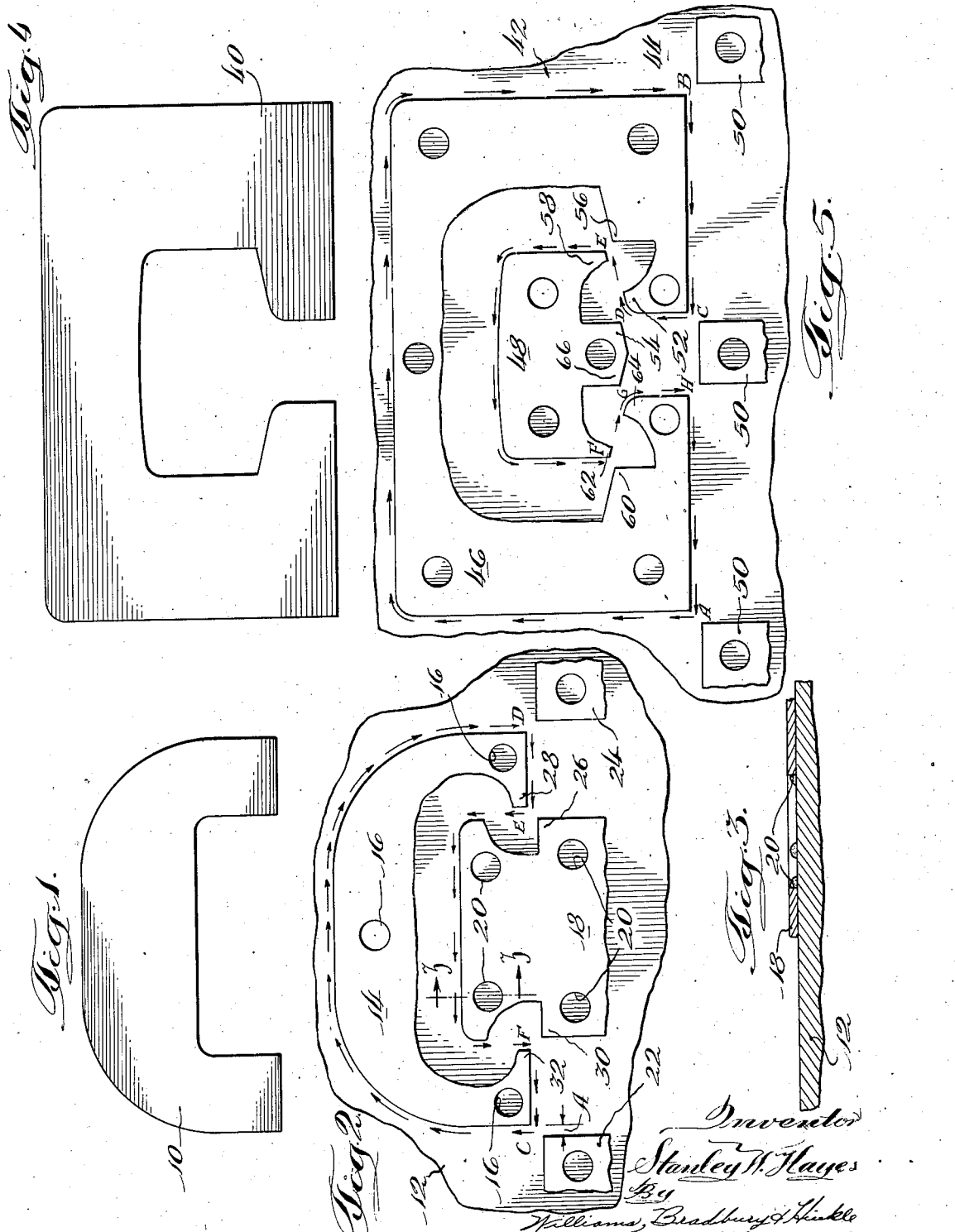

2,412,147

UNITED STATES PATENT OFFICE 2,412,147

TEMPLET

Stanley W. Hayes, Richmond, Ind., assignor to Hayes Track Appliance Company, Richmond, Ind., a corporation of Indiana Application August 26, 1942, Serial No. 456,144, which is a division of application Serial No. 325,084, March 20, 1940, now Patent No. 2,317,526, dated April 27, 1943. Divided and this application October 25, 1943, Serial No. 507,651

3 Claims. (Cl. 33—23)

The present invention relates to templets and particularly templets of the character adapted to be used in conjunction with metal cutting means so mounted that the cutting means duplicates the movement of tracing means, such as a tracing wheel. This application is a division of my co-pending application Serial No. 456,144, filed August 26, 1942, which is in turn a division of my application Serial No. 325,084, filed March 20, 1940, which issued as Patent No. 2,317,526 on April 27, 1943.

The primary object of the present invention is the provision of a new and improved templet.

A further object of the present invention is the provision of a new and improved templet so constructed that a tracing wheel may be moved thereabout readily and accurately.

Another object of the present invention is the provision of a templet of the character described so constructed that the tracing wheel may be moved on the outside of all the curves of the templet and so that changes in direction of movement of the tracing wheel may be made both quickly and accurately.

Further objects and advantages of the invention will become apparent from the ensuing description, in the course of which reference is had to the accompanying drawing, in which Fig. 1 is a plan view of a structural element;

Fig. 2 is a fragmentary plan view illustrating a templet made in accordance with the present invention for cutting out the structural element illustrated in Fig. 1;

Fig. 3 is a fragmentary cross-sectional view taken along the line 3—3 of Fig. 2;

Fig. 4 is a plan view of another structural element; and

Fig. 5 is a fragmentary plan view of a templet made in accordance with the present invention for cutting out the structural element of Fig. 4.

Templets made in accordance with the present invention are particularly adapted for use with apparatus such as torch cutting apparatus having a tracing wheel through which the torch is guided, the tracing wheel and torch both being mounted on a pantograph assembly. The tracing wheel may be made to follow a templet manually or through a power drive, but the templets of the present invention are particularly adapted for use when the tracing wheel is guided manually.

Metal templets are preferred for production purposes. They have the advantages of long life, and speed and require less skill in an operator. Metal templets that may be made readily and economically and which possess the advantages that the tracing wheel always moves on the outside of all curves and enables the operator to make accurate turns at just the right time and very quickly are shown in Figs. 2 and 5. These templets are provided for cutting out the structural element illustrated in Figs. 1 and 4, respectively.

Referring first to Figs. 1, 2, and 3, Fig. 1 discloses a structural element 10 and Fig. 2 a templet for cutting out the structural element. The base 12 of the templet, only a fragment of which is shown, and the parts of the templet proper referred to hereinafter are preferably made of sheet metal of a thickness of about 14 gauge. The templet is so constructed that the tracing wheel moves on the outside of all curves and guides are provided for both the front and rear of the wheel at each angle to assist the operator in making turns. At the instant of the turn the front of the wheel bears on one piece of the templet and the rear comes around against a supplementary piece assisting the operator to make the turn quickly and just at the right time.

The templet comprises a substantially U-shaped piece 14 punched at three places as indicated by the reference characters 16 to enable it securely to be welded to the base plate. Co-operating with this piece is a second piece 18 generally rectangular in shape and punched at four places, as indicated by the reference characters 20, to provide places for welding it to the base plate. Associated with the lower extremities of the U-shaped portion 14 are a pair of supplementary guide pieces 22 and 24, functioning to assist the operator in making turns quickly and at the right time.

If careful attention is given to Fig. 2, it may be noted that certain of the lines depicting the templet are drawn smoothly and the others more or less roughly. The purpose of this is to indicate those portions of the templet which should be dimensioned exactly in order to produce a structural element corresponding to that desired and also to indicate portions that need not be dimensioned exactly. The smooth lines indicate the portions which should be dimensioned exactly and the uneven lines indicate portions providing clearances and outer limits which need not be exactly dimensioned. The coplanar edges at the points where turns are made should be placed apart a distance approximately equal to the width of the tracing wheel. This dimension is indicated by the reference character A in Fig. 2. In cutting thicker plates, where a wider kerf is necessary, dimensions of the templet should be adjusted to allow for the greater amount of metal removed.

In using the templet illustrated in Fig. 2, the wheel is guided to travel from the point C clockwise along the line indicated by the arrows to the point D. Initial movement of the wheel is around the upper and outer extremity of the templet portion 14 to the point D, where a right angle turn is made. The operator is assisted at determining the proper moment, as well as in making the turn, by the supplementary piece 24. One side of the wheel is guided by piece 14 and the other by the piece 24. At the instant of the turn one side of the wheel bears on the one piece of the templet and the other side comes around to the supplementary piece.

After making the turn at D the wheel moves to the point E. During this movement the wheel bears against the lower side of one of the downwardly extended portions of piece 14 and at the point E the operator is assisted in making the turn by portions 26 and 28 of templet pieces 18 and 14, respectively.

In traveling from point E to point F the tracing wheel follows the upper and outer periphery of the templet part 18, and at point F portions 30 and 32 of templet parts 18 and 14 assist the operator in making the turn. In moving from point F to point C the tracing wheel follows the lower end of the other downwardly extending portion of templet part 14.

The structural element 40 shown in Fig. 4 is somewhat more complicated than the structural element 10, as is the templet for cutting the element. The templet, indicated generally by reference character 42, is shown in Fig. 5 to which reference is now had. It comprises a base 44 having welded to its upper surface a pair of templet defining metal plates 46 and 44 and three supplementary pieces 50 assisting the operator in making right angle turns. The operator is assisted in making turns other than right angles at a number of other places by adjacent portions of plates 46 and 48. There are four of these places as follows: (1) adjacent portions 52 and 54; (2) adjacent portions 56 and 58; (3) adjacent portions 60 and 62; and (4) adjacent portions 64 and 66. The templet is, like the previously described one, illustrated with the continuous smooth lines indicating exactly dimensioned portions, and the irregular lines indicating portions which need not be exactly dimensioned.

In use the operator starts from the position A and follows the arrows in a clockwise direction as indicated to the point B. During this movement the upper and outer surface of templet element 46 is followed. At point B the operator is assisted in making the turn by a supplementary piece 50. The under side of templet element 46 is followed from point B to C and at the latter point the operator is assisted in making the turn by a second supplementary piece 50. Another turn is made at point D, where assistance in making the turn is provided by adjacent portions 52 and 54 of templet pieces 46 and 48. At point E another turn is made in which the operator is assisted by adjacent portions 56 and 58 of the two templet pieces. Thereafter the operator follows the upper and outer edge of templet element 48 until reaching point F whereat the operator is assisted in making a turn by adjacent templet portions 60 and 62. Another turn is made at point G, where the operator is assisted in making the turn by adjacent templet portions 64 and 66. At point H the operator is assisted in making a turn by the second supplementary guiding piece 50. From point H the operator follows the under side of the left-hand side of the templet piece 46 to return to the starting point.

Templets made in accordance with the present invention may be constructed readily and simply and they are of advantage in that they enable the tracing wheel to be guided easily at all times. The templets are particularly advantageous in that curves are always followed on their outer edges and the operator is assisted in making turns by templet portions bearing against both sides of the tracing wheel.

Having thus described my invention, what I claim as new and desire to secure by Letters Patent by the United States is:

1. A templet adapted to be used with a tracing wheel of a metal working apparatus to effect movement of a part of the apparatus along a path requiring a change in direction of movement, as from a generally clockwise to a generally counter-clockwise direction and requiring relatively sharp turns to be made, including in combination, a base, wheel guiding structure having portions extending upwardly from the base, said portions being configured to correspond to the desired movement of the said part of the apparatus and having wheel guiding surfaces so located that one side of the wheel may be brought against certain surfaces corresponding to a generally clockwise movement of the wheel and the other side of the wheel may be brought against other surfaces corresponding to a generally counter-clockwise movement of the wheel, said portions being substantially continuous to correspond to continuous portions in the work piece whereby said tracing wheel may be made always to follow the outsides of surfaces, and discontinuous in regions whereat a change in direction of movement of the wheel is required, whereby the direction of movement of the wheel may be readily changed from clockwise to counter-clockwise and vice versa, and structure providing supplementary guiding surfaces to assist an operator in making sharp turns with the tracing wheel, said supplementary guiding surfaces being parallel to but spaced from said first mentioned guiding surfaces a distance sufficient to provide a lane for the wheel and to engage the other side of the wheel as the wheel is brought around the turn.

2. A templet adapted to be used with a tracing wheel of a metal working apparatus to effect movement of a part of the apparatus along a path requiring a change in direction of movement, as from a generally clockwise to a generally counter-clockwise direction, including in combination, a base, wheel guiding structure having portions extending upwardly from the base, said portions being configured to correspond to the desired movement of the said part of the apparatus and having wheel guiding surfaces so located that one side of the wheel may be brought against certain surfaces corresponding to a generally clockwise movement of the wheel and the other side of the wheel may be brought against other surfaces corresponding to a generally counter-clockwise movement of the wheel, whereby said tracing wheel may be made always to follow the outsides of surfaces, and structure providing supplementary guiding surfaces to assist an operator in changing the direction of movement of the tracing wheel, said surfaces being parallel to but displaced from adjacent first mentioned surfaces a distance sufficient to provide a lane for and to engage the other side of the wheel as the direction of movement of the wheel is changed.

3. A templet adapted to be used with a tracing wheel of a metal working apparatus to effect movement of a part of the apparatus along a path requiring a change in direction of movement, as from a generally clockwise to a generally counter-clockwise direction, and requiring relatively sharp turns to be made including in combination, a base, wheel guiding structure having portions extending upwardly from the base, said portions being configured to correspond to the desired movement of the said part of the apparatus and having vertical wheel guiding surfaces so located that one side of the wheel may be brought against certain surfaces corresponding to a generally clockwise movement of the wheel and the other side of the wheel may be brought against other surfaces corresponding to a generally counter-clockwise movement of the wheel, whereby said tracing wheel may be made always to follow the outsides of surfaces, and structure providing supplementary vertical guiding surfaces to assist an operator in changing the direction of movement of and making sharp turns with the tracing wheel, said surfaces being parallel to but displaced from adjacent first mentioned surfaces a distance sufficient to provide a lane for and to engage the other side of the wheel as the direction of movement of the wheel is changed and as the wheel is brought around a turn.

STANLEY W. HAYES.